Aug. 16, 1966 N. E. ANDERSON 3,267,251
ELECTROMECHANICAL PROGRAMMING AND FUNCTION GENERATING SYSTEM
Filed Sept. 13, 1963 5 Sheets-Sheet 3

INVENTOR.
NELSON E. ANDERSON,
DECEASED
BY SEVERA B. ANDERSON
ADMINISTRATRIX

BY John W. Gaines
ATTORNEY

Aug. 16, 1966         N. E. ANDERSON         3,267,251
ELECTROMECHANICAL PROGRAMMING AND FUNCTION GENERATING SYSTEM
Filed Sept. 13, 1963                         5 Sheets-Sheet 4

FIG. 3

INVENTOR.
NELSON E. ANDERSON,
DECEASED
BY SEVERA B. ANDERSON
ADMINISTRATRIX
BY John W. Gaines
ATTORNEY

United States Patent Office 3,267,251
Patented August 16, 1966

3,267,251
ELECTROMECHANICAL PROGRAMMING AND
FUNCTION GENERATING SYSTEM
Nelson E. Anderson, deceased, late of Berkeley Heights, N.J., by Severa B. Anderson, administratrix, Berkeley Heights, N.J., assignor to Air Reduction Company, Incorporated, New York, N.Y., a corporation of New York
Filed Sept. 13, 1963, Ser. No. 309,375
5 Claims. (Cl. 219—125)

This invention relates to apparatus and methods for generating functions for programming apparatus and operations, and more particularly to programming systems and program storage facilities wherein a plurality of parameters governing an operation such as a welding operation may be automatically and continuously varied along the length of a work path such as a seam to take into account physical characteristics of the workpiece which vary from point to point along the seam.

In one field of application of the invention, the workpiece varies in thickness along the direction of the seam and it is desired to control the operation of the welding head so as to vary (1) arc voltage, (2) arc current, (3) wire feed speed of filler wire or consumable electrode, and (4) speed of travel of the welding carriage along the length of the seam. It is desired that each of these parameters of the welding process shall be given optimum value at each point along the seam. The optimum value of each parameter is generally a function of the thickness of the workpiece at the point of the weld. Therefore, in portions of the workpiece where the thickness of the workpiece is tapered along the direction of the seam, it is desirable that each parameter have in general one value at the start of the taper and a different value at the end of the taper and also that the value of the parameter vary continuously between the beginning and the end of the tapered portion. Furthermore, it is generally found that the optimum value of a given parameter does not vary linearly, particularly along a long uniformly tapered portion of the workpiece. Thus it is desirable to subdivide a long tapered portion into shorter sections within which the parameter will vary approximately linearly so that the desired valves may be set into a stored program for the beginning and end of each such subdivision and so that proportionate values of the parameter may be automatically obtained at intermediate points.

According to the invention, the present weld programming system is operated by a novel process comprising developing at a plurality of points fixed voltages proportional to desired values of a given welding parameter at corresponding successive points along a weld path, deriving an interpolated voltage affording a variation in value equal to a fixed voltage at a given point corresponding to such point along the weld path but equal to the interpolated value at all points between each two successive voltage points, and controlling said welding parameter continuously in accordance with the variations of said interpolated voltage during progress along the entire length of said path.

The program storing facility is electromechanical, comprising a plurality of banks of electric potentiometers each preferably with a calibrated self-indicating digital dial for setting up a desired value of a parameter. A separate bank of potentiometers is assigned to each parameter of the welding process. Each potentiometer in the bank stores information to control the value of the selected parameter at a different position point along the seam. The potential set up on each potentiometer of the same bank is impressed upon a different point along the length of a relatively long potentiometer winding, points along the length of which latter correspond to points along the length of the seam. The long potentiometer is termed an "interpolating potentiometer," and has a movable contactor termed an "interpolating contactor," which in accordance with the invention is controlled by the movement of the welding carriage along the actual seam to move along the interpolating potentiometer in synchronism with the movement of the welding carriage. The point along the length of the interpolating potentiometer at which each of the parameter setting potentiometers is connected may be adjusted so that the set value of the parameter appears at the point on the interpolating potentiometer corresponding to the point along the seam where the set value is to be made effective. Between set points the potential on the interpolating potentiometer varies substantially linearly between the set values as is well known in the art.

Each bank of parameter setting potentiometers is provided with an interpolating potentiometer individual to that bank and to the particular parameter associated with that bank. At each instant during the welding operation, the moving interpolating contactors of the several interpolating potentiometers pick up potentials which are transmitted to the control circuits of the welding machine to vary the parameters of the machine in accordance with the program that has been set up on the parameter setting potentiometers. Servomechanisms are used to attain continuous agreement between the position of the welding carriage along the seam and the position of each interpolating contactor along the length of its associated interpolating potentiometer. Another servomechanism is provided so that the starting position of the welding operation may be set at any desired point along the track of the welding machine, and the interpolating contactors of the interpolating potentiometers then may be automatically set to their zero positions along their respective windings.

In the operation of the system of the invention, key points are selected along the length of the workpiece at which the values of the parameters are to be specified and the parameter setting potentiometers are connected to the corresponding points along the interpolating potentiometers by means of the interpolating contactors which may be moved along the windings of the interpolating potentiometers by means of lead screws preferably controlled by calibrated, self-indicating digital dials. A set of prescribed values is prepared, as from calculations based upon experience, for each parameter at each selected point along the seam and these values are set up on the parameter setting potentiometers. The welding carriage is then set at the beginning of the seam and the interpolating potentiometers are brought to their zero positions, whereupon the welding operation may be started and continued automatically along the entire seam. The settings of the parameter setting potentiometers constitute a continuing record which may be used repeatedly for welding substantially identical workpieces in any desired quantity. A new program may, however, be set up readily whenever desired.

Other features, objects and advantages will appear from the following more detailed description of an illustrative embodiment of the invention, which will now be given in conjunction with the accompanying drawings.

In the drawings:

FIG. 1, comprising

3

Figure 1A:
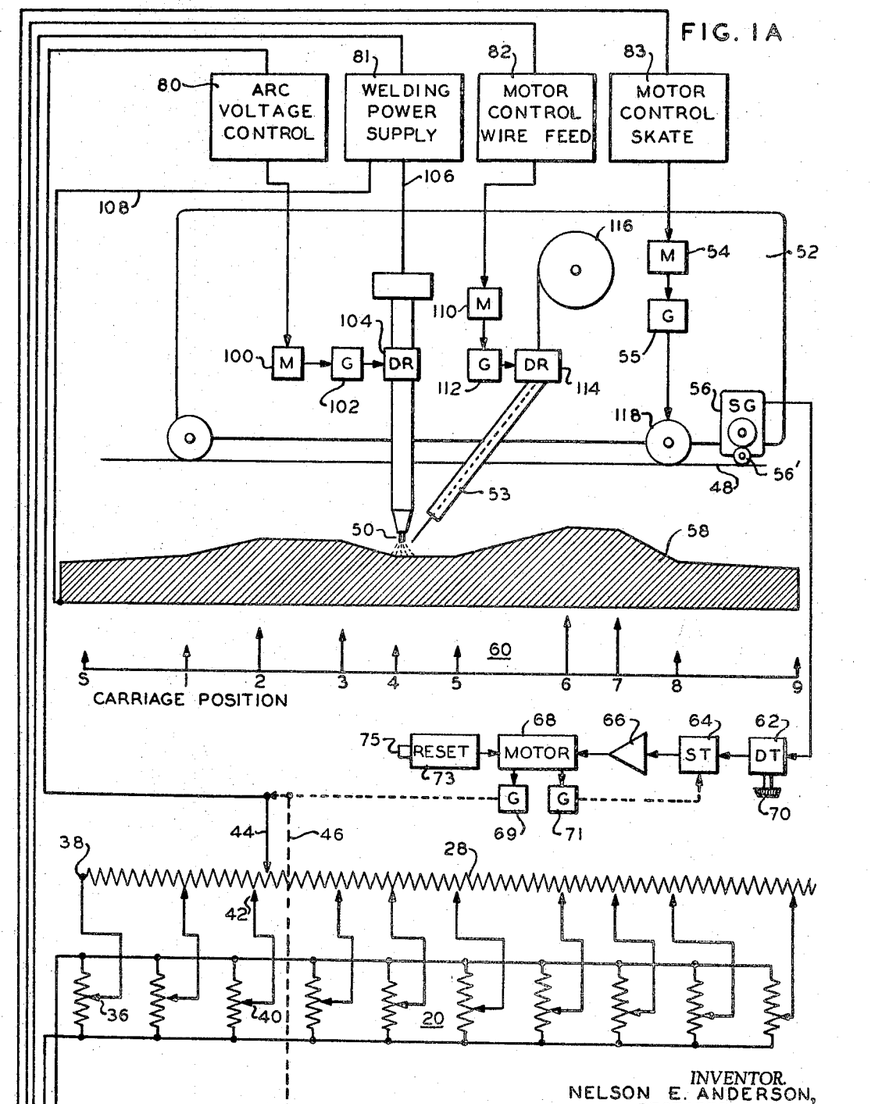
FIGS. 1A and 1B, is a schematic diagram, electrical and mechanical, of a programming system in accordance with the invention.
Figure 1B:
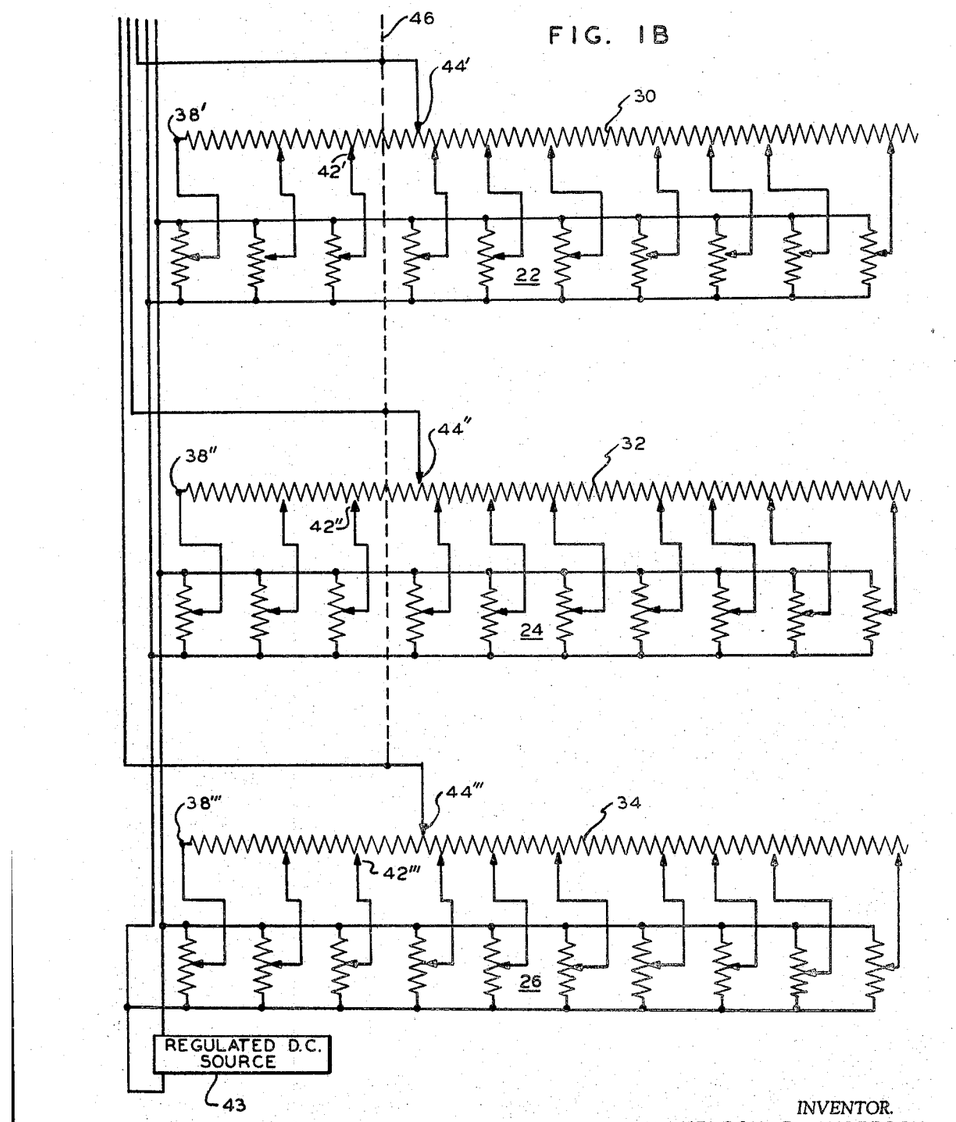

In FIG. 1, the carriage track or gear rack of a welding machine is shown schematically at 48, upon which track the machine is represented schematically with a welding electrode 50, carriage 52, filler wire feeder 53, drive motor 54 and a synchronous generator 56, the latter for use in synchronizing the programming system with the travel of the carriage of the welding machine along the track 48. A workpiece of varying thickness is shown schematically in cross section at 58, in operative relation to the welding machine. A representative set of welding parameters, such as arc voltage, is represented at 60, the heights of the arrows indicating the values of the parameter at selected positions S, and 1–9, along the length of the workpiece. The set 60 represents only one of the parameters that may be set up on the parameter setting potentiometers, which values may be set up on a bank 20 of the potentiometers. Three other sets of parameter values (not shown), different from the set 60, are assumed to be available for setting up on other banks 22, 24 and 26 respectively.

Figure 2:
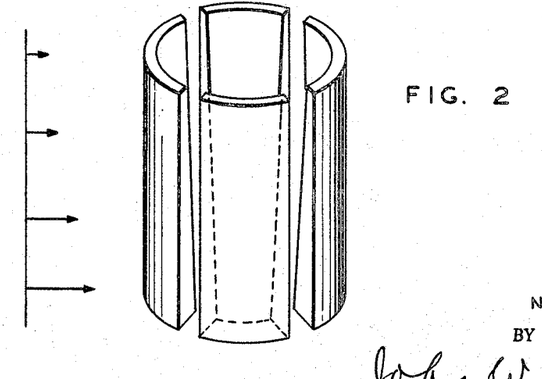
FIG. 2 is a perspective view of illustrative workpieces to be welded, together with values of a welding parameter pertinent to various points along a seam between such workpieces.

FIG. 2 shows another illustrative type of workpiece to which the invention is applicable, namely parts to be welded together to form a right cylinder with uniformly tapered walls, thickest at the bottom and becoming thinner toward the top, such as might be used in a tank for confining a liquid, in which the pressure of the liquid is linearly proportional to the depth of the liquid, due to static head, or as in the case of a missile under acceleration to dynamic head. In the figure, the amount of the taper is exaggerated for emphasis. In the welding of these workparts, the welding parameters midway along the seam are not necessarily the mean of what the welding parameters are at the opposite ends of the seam. The parameter may vary in some nonlinear manner as a function of length along the seam, even though the tapered workpiece varies strictly linearly in its thickness along the seam. Accordingly, the seam may be subdivided into a plurality of sections over each of which the parameter varies substantially linearly, and a set of values of the parameter may be prepared which values may be set up on the parameter setting potentiometers corresponding to selected positions along the single uniform taper, as indicatde schematically in FIG. 2 by horizontal arrows of different lengths located at different vertical levels along the height of the cylinder.

FIG. 1 shows four banks 20, 22, 24 and 26 of ten potentiometers each, which may be assigned one bank for each of four welding operational parameters, for example, arc voltage, arc current, wire feed speed, and skate or carriage travel speed, respectively. Each bank of potentiometers is connected to an interpolating potentiometer winding individual thereto. In the drawing, the banks 20, 22, 24 and 26 are shown connected to the interpolating potentiometer windings 28, 30, 32 and 34, respectively. Each potentiometer in the bank 20 has its movable contactor connected to a different point on the winding 28. The first potentiometer at the left-hand end of the bank 20 has its movable contactor 36 connected to the left-hand end of the winding 28 (position S). The other potentiometers of the bank 20 have their movable contactors connected to adjustable contactors distributed along the length of the winding 28 (at selected adjustable positions 1–9), a typical movable contactor 40 being connected to an adjustable contactor 42 at position 2 as shown. The connections of the potentiometers in the other banks to their respective interpolating potentiometer windings will now be evident from the typical connections already described in conjunction with bank 20. All the parameter setting potentiometers may be energized from a regulated direct current source 43, or from separate regulated sources.

The windings 28, 30, 32 and 34 are preferably helical, substantially identical in dimensions, and aligned along a common axis. The banks of parameter setting potentiometers are preferably mounted upon a panel adjacent to the interpolating potentiometer windings and each parameter setting potentiometer may be provided with a direct reading calibrated digital dial for adjusting the setting to a given value of a welding parameter.

The adjustable contactors of which contactor 42 is typical are preferably mounted in slidable fashion upon lead screws and guide rods extending parallel to the longitudinal axis of the helix for axial adjustability along the common axis of the helical interpolating windings. One typical lead screw and associated guide rod carries the contactor 42 and a set of contactors 42', 42" and 42''', all four of which cooperate to apply voltages representing a set of four welding parameters to the respective windings 28, 30, 32 and 34 at one selected point along each said winding, to be effective at one of the selected points along the weld. The contactors 42, 42', 42" and 42''' are so positioned upon the lead screw that when the lead screw is rotated the contactors always remain each at substantially the same distance from the beginning points of their respective interpolating windings, which beginning points are shown at 38, 38', 38" and 38''' respectively. Nine sets of these adjustable contactors are shown. In addition to nine lead screw-guide rod pairs for the adjustable contactors a tenth such pair is provided for moving a set of four interpolating contactors along the interpolating windings as will next be described. The respective lead screw and guide rod pairs are preferably spaced around the circumference of the helical winding assembly at equal angular intervals.

The interpolating contactors are shown at 44, 44', 44" and 44''' respectively, and are preferably mounted upon the lead screw at such relative positions that when the screw is rotated the interpolating contactors always remain each at substantially the same distance as the others from the beginning of its interpolating winding. The lead screw for the interpolating contactors is represented schematically in the figure by a dotted line 46. Dotted lines similar to line 46 to represent schematically the other nine lead screws have been omitted from the drawing to avoid excessive crossing of lines, inasmuch as the relationship of the contactors to their respective lead screws is clearly shown in FIG. 4. Each of the ten lead screws may be provided with a direct reading calibrated digital dial for adjusting the position locations of the respective adjustable contactors. The nine adjustable contactors associated with parameter settings are adjusted to selected positions along the helical winding before the start of a welding program and are left in place for the duration of the program. The interpolating contactors 44, 44', 44" and 44''' are adjustable by hand as a group if desired but are ordinarily moved automatically by the program control mechanism, the dial in this case being used to indicate the carriage position at any given time.

The motor 54 through a gear train 55 drives the welding carriage 52 along the track 48 in the customary manner. The synchronous generator 56 is turned by traction with or gearing to the track or rack 48 to represent the position of the carriage 52 along the track or rack 48 at all times during a programmed welding operation. A control signal generated in the synchronous generator 56 is continuously transmitted in known manner of synchronous control systems to a differential synchronous control transformer 62 having a manual control such as a hand wheel or dial 70 for resetting when neceessary the starting position of the interpolating contactors 44 etc. A control signal generated in the control transformer 62 is transmitted in known manner to a synchronous control transformer 64. A control signal induced in the transformer 64 is amplified in an amplifier 66 and used in known manner to control the supply of power to a motor 68 which drives the interpolator lead screw 46 through a reduction gear train 69 to move the interpolating contactors in synchronism with the welding carriage 52. The motor 68 through another gear train 71 also turns the rotor of the transformer 64. In known manner, an error signal is induced in the transformer rotor whenever there is a difference between the welding carriage position and the corresponding position of the interpolating contactors along the interpolating winding, so that correspondence is normally maintained between these two positions.

At all times during a welding program the individual interpolating contactors 44, etc., are electrically connected to suitable control devices 80, 81, 82, 83 in the welding machine to make the value of each welding parameter substantially equal the value represented by the potential on the interpolating potentiometer at the point of contact of the respective interpolating contactor.

Reset means 73 with reset button 75 is provided for motor 68 so that at the end of a welding run the motor 68 may be driven independently of the servomechanism to bring the interpolating contactors back to their starting positions. When the reset means 73 is actuated, by pressing the reset button 75, the motor 68 runs uninterruptedly until stopped by a limit switch 430 (FIG. 4) geared to the carriage position of the lead screw.

The mechanisms by which the potentials picked up from the interpolating potentiometers by the interpolating contactors effect the desired controls are indicated schematically in FIG. 1 and will not be described in much detail, as controls of welding parameters by means of electrical signals are known and are not a part of the present invention. Illustrative connections are, however, shown in block diagram form in FIG. 1.

For the control of the arc voltage, a system of the type disclosed in U.S. Patent No. 2,832,000, issued April 22, 1958, to R. B. Steele, is suitable when a non-consumable electrode is used in the welding process. To use this type of control, the potential picked up by the interpolating contactor 44 assigned to the arc voltage parameter may be substituted in the circuit of the Steele patent for the potential at the grid 71a of the dual triode 71, incorporated in the control device 80, shown in FIG. 1 herein, which control device may be in accordance with the Steele patent. The Steele patent describes a method of control of the arc voltage by controlling the arc length which in turn substantially determines the arc voltage. The arc length is controlled in the system of the Steele patent by advancing or retracting the electrode with respect to the workpiece so as to maintain the desired arc length.

For the control of the arc current in accordance with the present invention, the control device 81 may be a programmed power supply as disclosed in an application of William J. Greene, Serial No. 51,107, filed August 22, 1960. In the present invention, the potential picked up by the interpolating contactor 44' assigned to the arc current parameter may be substituted for the potential impressed upon the grid of the triode 302 from the function generator by the lead 313 in FIG. 3–B of the Greene application.

For the control of filler wire feed speed in the non-consumable electrode process or the speed of the wire for the consumable electrode process and likewise for control of skate travel speed, a motor speed control system of the type disclosed in U.S. Patent No. 2,870,391, issued January 29, 1959, to R. E. Purkhiser, is suitable. To use this type of control, the potential picked up by the interpolating contactor assigned to the speed parameter in question may be substituted for the potential at the movable contactor of the potentiometer 18 of the Purkhiser system.

In FIG. 1, the interpolating contactor 44", assigned to the wire feed speed parameter, is shown connected to a motor control 82 and the interpolating contactor 44''', assigned to the skate speed, is shown connected to a motor control 83. The controls 82 and 83 may be in accordance with the Purkhiser patent, cited.

The arc voltage control 80 is shown schematically as being connected to a motor 100 which through gearing 102 drives a mechanism 104 for controlling the spacing between the electrode 50 and the workpiece 58. The welding power supply 81 is shown connected through a welding cable 106 which connects at a suitable point (not shown) to the electrode 50 in known manner, to supply direct current to the electrode, and the supply 81 is connected to the workpiece 58 by a welding cable 108 which forms a return path for the welding current.

The motor control 82 is shown connected to a motor 110 which through a gearing 112 controls the speed of a driving mechanism 114 which moves filler wire from a storage reel 116 through the guide tube 53 to the region of the arc. The motor control 83 is shown connected to the motor 54 which through the gearing 55 drives a traction wheel 118 or suitable gear to propel the welding carriage 52 along the track 48.

It will be understood by those skilled in the welding art that the electrode 50 may be either a substantially non-consuming electrode or a consumable wire. In the latter case it will be evident that the wire that is fed from the reel 116 by the drive means 114 may be consumable electrode wire instead of filler wire, and that the electrode wire may be fed in known manner through an electrode contact tube in the welding head in place of the electrode 50 shown. In either case, the control device 82 serves to control the speed of the wire feed.

At the end of a programmed welding operation, the welding machine may be moved back to the starting point either manually or automatically in order to begin another weld, using the same program as before, which program remains set up in the banks of potentiometers. In the course of returning the welding carriage, synchronism may sometimes be lost. In such cases, the interpolating contactors 44, etc., may be returned to the starting point manually or by using the reset means 73. If synchronism has been lost, then when the reset means 73 is de-energized, the control system will usually displace the contactors 44, etc. from zero to whatever position agrees with the location of the welding carriage. It is not necessary that each succeeding weld be started at the same starting point in the welding machine. In any case, with the welding carriage at the desired starting position, the differential synchronous transformer 62 may be manually adjusted to restore the interpolating contactors to their zero positions. For this purpose the transformer 62 is provided with the manual control 70. This control may be turned as needed to bring the dial on the screw 46 to read 0000, indicating that each interpolating contactor is at the starting point of its respective interpolating potentiometer winding.

Figure 3:
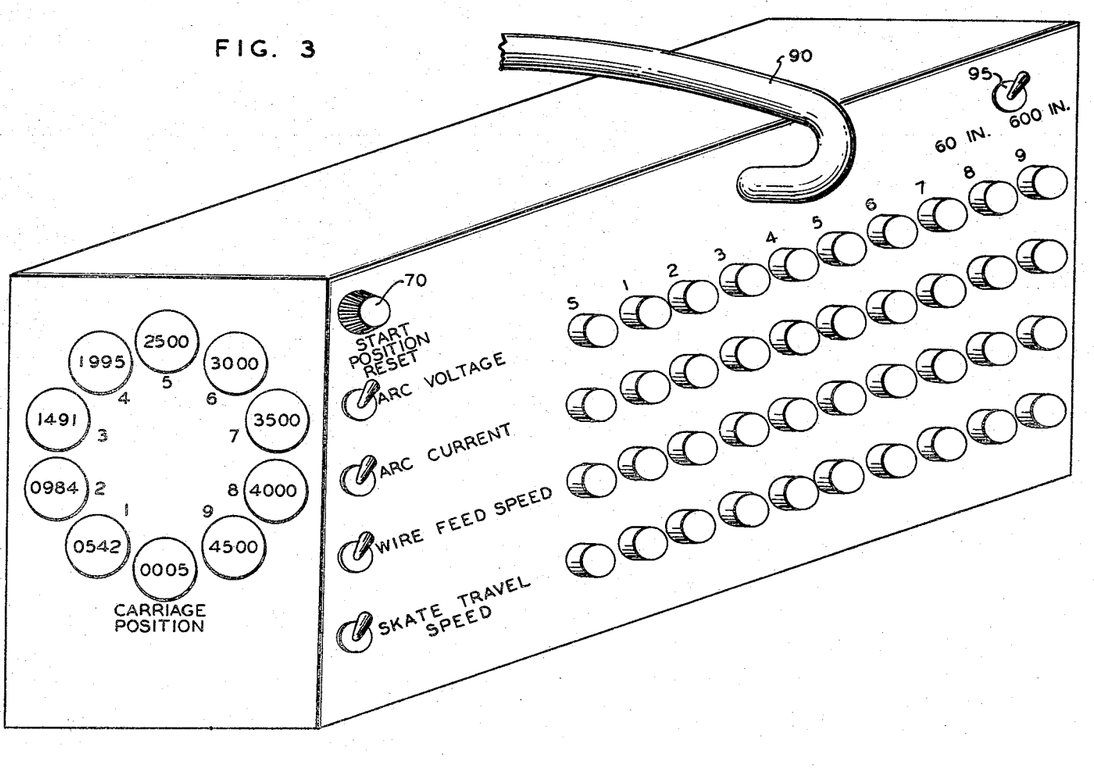
FIG. 3 is a perspective view of a programming control set for use in the system of FIG. 1.

FIG. 3 shows the general external appearance of the programming control set. The front end panel shown at the left in the figure has projecting from its face the ten direct reading digital dials arranged in a circular array with the carriage position dial at the bottom. The carriage position dial controls simultaneously the positions of all the interpolating contactors 44, 44', 44", 44'''. In clockwise order around the rest of the circle are the nine position setting dials, numbered consecutively for the nine selectable position settings. Each of these nine dials, controls simultaneously the position of four position selecting contactors such as 42, 42', 42" and 42'''. The numbers shown on the dials in the figure are illustrative of a set of position selections and the carriage position shown as 0005 is illustrative of the carriage position after the start position reset button 75 has been pressed but before the rotor of the differential synchronous transformer 62 has been adjusted by means of the handle 70 to bring the carriage position reading to 0000.

The long side panel at the right in the figure has projecting from its face the digital dials for the four banks of parameter setting potentiometers 20, 22, 24 and 26. Each horizontal row of dials relates to a different one of the four selected welding parameters. In the figure, these rows are labeled, from top to bottom, as "Arc Voltage," "Arc Current," "Wire Feed Speed" and "Skate Travel Speed." The dials are arranged in ten vertical columns, the first of which is labeled "S" for starting position, and the others of which are numbered from 1 to 9 to represent the several selectable positions along the length of the weld. In the upper left-hand corner of the long side panel is the start position adjusting dial 70 for manually adjusting the position of the rotor of the differential synchronous transformer 62.

The control cable 90 connecting the programming machine with the welding machine may be plugged in, as shown, into a multicontact socket on the upper part of the long side panel.

Suitable direct reading digital dials are obtainable from Borg Equipment Division, Amphenol-Borg Electronics Corp., under the designation "Borg Microdial."

Figure 4:
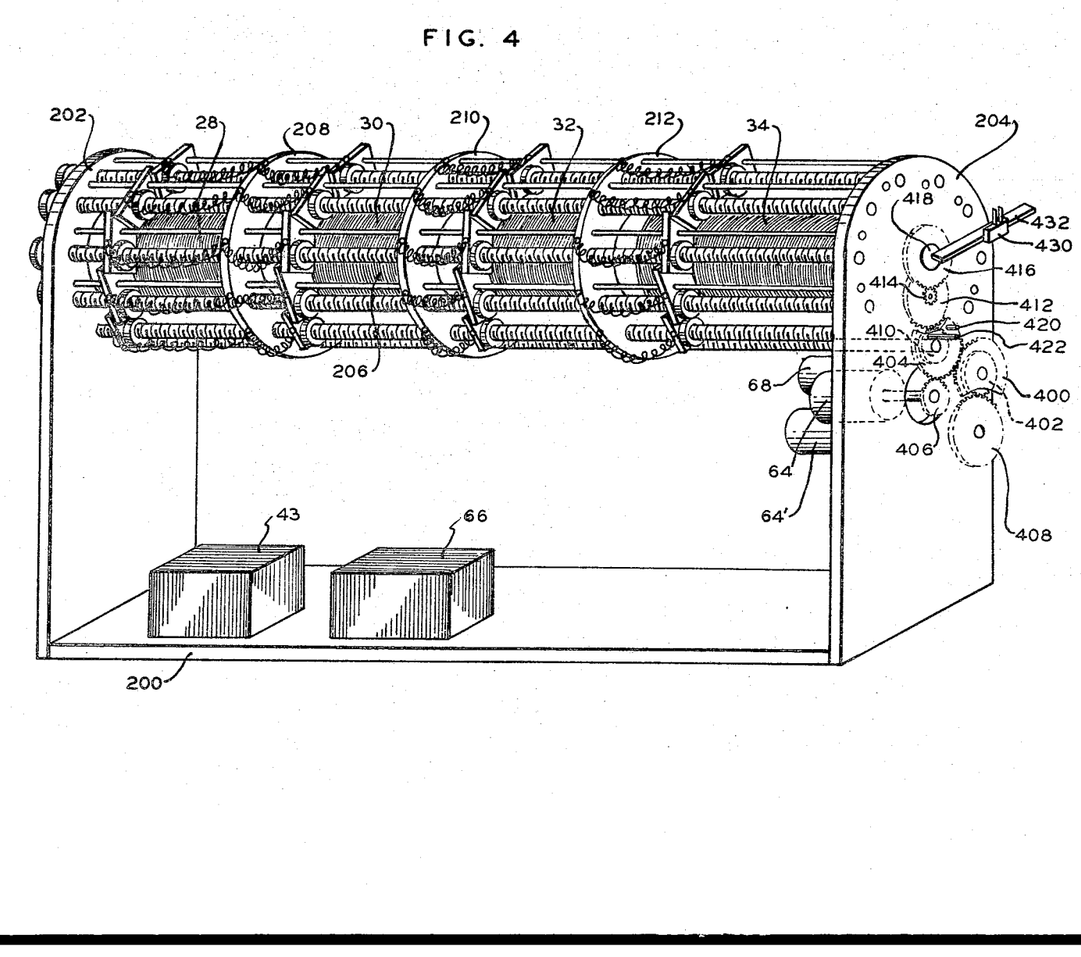
FIG. 4 is a perspective view of a chassis for the control set of FIG. 3.
Figure 5:
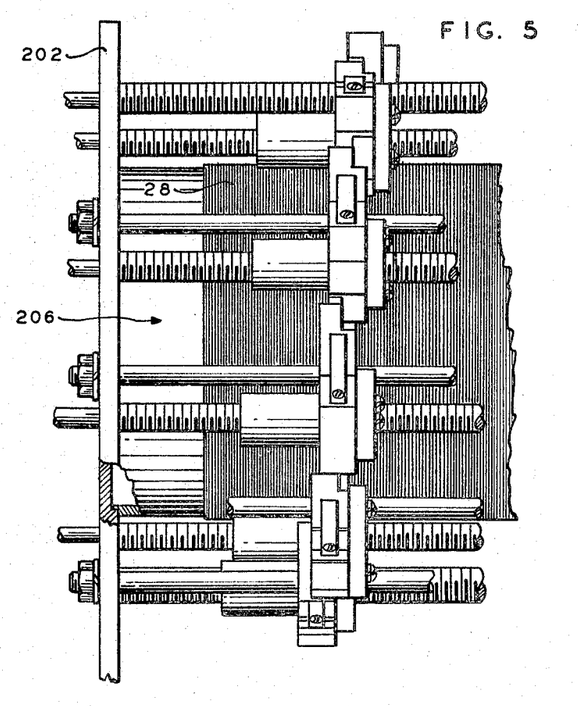
FIG. 5 is an elevational view of a portion of the chassis shown in FIG. 4.

FIGS. 4 and 5 show an illustrative electromechanical embodiment of the programming machine. It has a frame comprising a base 200 and end support members 202 and 204. A long cylindrical coil supporting form 206 extends from end to end between the end support members at the center of the semicircular top portions of the end support members. On this form 206 are wound the four interpolating potentiometer windings 28, 30, 32, 34 separated by blank spaces. Arranged in a circular array around the coil form 206 are the ten lead screws and the ten guide rods for the contactors that make contact with the interpolating potentiometer windings. Mounted rigidly upon the guide rods and having clearance holes for the lead screws are three ring members 208, 210, 212 which serve to divide the interpolating potentiometer assembly into four divisions and which serve as connector blocks for connections from the parameter setting potentiometers to the position selecting contactors. If desired, a fourth such ring member may be added so that each division may have a separate ring. In each of the divisions of the interpolating potentiometer assembly there are nine position selecting contactors and a carriage position contactor, each threadedly engaged upon one of the lead screws and slidably mounted upon the adjacent guide rod. The contactors for position selection are preferably so shaped that no one position selecting contactor may pass another and they always maintain their proper numerical order along the length of the interpolating winding. Furthermore, they are only allowed to approach each other to a point such as to leave enough resistance between them in the interpolating potentiometer to prevent short-circuiting adjacent parameter-setting potentiometers. The carriage position contactor, on the other hand, must be free to pass the other contactors so that it may pass freely from end to end of the interpolating winding, passing all the other contactors in turn. At the starting end of each interpolating winding, a fixed connection is made to the respective winding.

In the assembly of the machine all the position selecting contactors for position 1 are moved along the lead screw to such initial positions that the spacing along the interpolating winding between the starting point connection and the point of contact of the position selecting contactor is the same for each contactor. The same is done for each of the other eight sets of position selecting contactors, so that after assembly if any position selecting dial is turned, all the position selecting contactors controlled by that dial will be moved along the interpolating windings simultaneously and will at all times be equidistant from their respective starting point connections. In assembling the carriage position or interpolating contactors upon their lead screw, each contactor is so positioned upon the lead screw that after assembly it will be exactly at the starting point connection on its proper division of the interpolating winding. With the interpolating contactors so adjusted, the dial for indicating the carriage position is set precisely at 0000. Coiled or pig-tail insulated connectors are provided for connecting each position selecting contactor to a designated fixed terminal on one of the insulating rings.

Illustrative relative positions of the interpolating potentiometer 28 and associated lead screws, guide rods and contactors are shown in FIG. 5, while in FIG. 4 the showing is only approximate and the carriage lead screw is omitted to promote clarity in the drawing.

The parameter setting potentiometers may be mounted on the rear of the long side panel, one behind each parameter setting dial, the shaft of the potentiometer being directly connected mechanically with the dial. Fixed connections are run from the regulated direct current supply in parallel to all the parameter setting potentiometer windings, and fixed connections are run from each movable contactor of a parameter setting potentiometer to a proper designated one of the fixed terminals on the insulating rings or to the starting point of one of the interpolating windings, as the case may be. Individual switches may be provided on the face of the long side panel as shown for connecting or disconnecting each bank of potentiometers to or from the regulated direct current supply source. When it is desired that there be programmed control of less than four parameters, the switches for the unused parameters may be placed in the off position and the parameters not under programmed control may be manually controlled at the welding machine by the operator.

In an embodiment that has been built and successfully operated, a maximum length of seam of 600 inches is provided for. The same programming chassis and control set is further adapted to be used with a maximum length of seam of 60 inches. In the latter case, greater precision of parameter settings is obtainable with the same lead screws and dials.

The synchronous generator 56 is coupled to the gear rack 48 on the carriage track of the welding machine with a seven-eighths inch diameter spur gear 56'. Thus each revolution of the synchronous generator 56 represents seven-eighths times $\mu$ or 2.7489 inches distance of travel of the welding machine along the track. This is approximately 2.75 inches with an error of only 0.04 percent. The gearing in the programming machine, as described in detail below, is such that the carriage lead screw in the programming machine rotates one turn per inch of welding machine carriage travel, in the 0–60 inch range, and such that the said lead screw rotates one turn for ten inches of welding machine carriage travel in the 0–600 inch range. Other gear relationships are of course possible; for example, if the lead screw in the programming machine rotates one turn for five inches of welding machine carriage travel, the range of the unit would be 0–300 inches. Since direct reading dials are available that read in tenths of a turn of the lead screw, the proper choice of gear ratio enables the dial to read directly in inches and decimal parts of inches of travel of the welding machine carriage for the selected range of travel.

On the right-hand end support of the programming chassis are mounted two synchronous transformers 64 and 64' associated with the two different length ranges of welds, 600 inches and 60 inches, respectively, together with the differential synchronous transformer 62, the servo motor 68 and a number of gear trains the purposes of which will now be described.

The amplifier 66 and the regulated direct current supply 43 may be mounted on the base plate of the chassis.

Mounted upon the shaft of the motor gear reduction 69 are gear wheels 400 and 402, of which the wheel 400 is preferably made of fiber. The wheel 400 meshes with a wheel 404 which has the same number of teeth as wheel 400 and is mounted directly upon the carriage position lead screw. The wheel 404 also meshes with a gear wheel 406 mounted directly upon the rotor shaft of the synchronous transformer 64. The wheel 402 meshes with a gear wheel 408 that is mounted directly upon the rotor shaft of the synchronous transformer 64'. The carriage position lead screw also has mounted thereon a gear wheel 410 which meshes with an idler gear 412. On the same shaft with and rigidly connected with the wheel 412 is a gear wheel 414 which meshes in turn with a gear wheel 416 mounted upon a shaft 418. In the embodiment which has been built and successfully operated, the number of teeth on the various gear wheels are as listed in the following table.

| Gear wheel: | No. of teeth |
| --- | --- |
| 400 | 80 |
| 402 | 32 |
| 404 | 80 |
| 406 | 22 |
| 408 | 88 |
| 410 | 8 |
| 412 | 72 |
| 414 | 9 |
| 416 | 72 |

Reference to the gear ratios indicated in the table shows that the rotor of the synchronous transformer 64' turns one-tenth as fast as the rotor of the synchronous transformer 64. In the control operation, the transformer 64 is arranged to move the interpolating contactors over the full length of the interpolating winding while the welding machine travels the full range, 600 inches in the embodiment referred to. The synchronous transformer 64' may be used instead of the synchronous transformer 64 to move the interpolating contactors over the same full length of the interpolating winding while the welding machine travels but one-tenth of the full range, or 60 inches. The shaft 418 turns once for 72 turns of the carriage position lead screw. This shaft is used to operate an arm 432 mounted directly thereon which cooperates with a pin 420 fixedly attached to the outer face of the gear wheel 404 to stall the programming machine and the motor 68 at either end of the interpolating winding, even though the welding machine may be operated over a wider range than is accommodated by the interpolating winding.

In the embodiment referred to, the carriage position lead screw is limited by the arm 432 and pin 420 to 62 turns, the additional ten turns being unavailable on account of the space taken up by the arm 432 and limit switch 430 as they are turned by the shaft 418. The motor 68 is preferably of a type which may be stopped or stalled without harm thereto when the arm 432 strikes the pin 420. The gear wheel 404 also has affixed to its outer face a second pin 422 which in the embodiment illustrated is longer than the pin 420 and is located closer to the center of the wheel 404 than is the pin 420. Just prior to the time when the arm 432 strikes the pin 420 as the interpolating contactors approach the starting end of the interpolating potentiometers, the long pin 422 operates the limit switch 430 to disconnect the reset means 73 and put the motor 68 back onto the automatic control of the synchronous transformers and amplifier. The limit switch 430 may also activate a pilot light to tell the operator when the carriage of the programming machine has been returned to the starting point. If, after the operator has returned the welding machine to its starting point, the pilot light does not come on, the operator knows that he must then manipulate the reset button 75 to return the programming machine to its starting point, whereupon the pilot light will light.

Switching may be provided for selecting which of the two synchronous transformers is in control of the motor 68. For the 600 inch range, the synchronous transformer 64 is used, and for the 60 inch range the synchronous transformer 64'. FIG. 3 shows a manual two-position switch 95 in the upper right-hand portion of the long side panel for selecting between the two available ranges.

It is to be understood that while the invention has been described herein with reference to variations of the welding parameters as a function of the thickness of a workpiece, the variation may be a function of any characteristic feature of the workpiece for example the proximity to the weld seam of a heat sink in the form of a boss or barrier strip, or a gap between the two pieces to be welded.

This apparatus can be used as an adjustable function generator for purposes other than programming welding parameters. For example, it provides a means for generating mathematical and empirical non-linear functions, including those with multiple slope reversals which are difficult to generate with previously known apparatus. For this purpose, the individual parameter setting potentiometers are set to represent values of the function at selected carriage positions where a change or reversal of slope is required. In this case the carriage positions represent values of an independent variable or the abscissae of the graph of the function and the potentiometer settings represent values of a dependent variable or the ordinates of the graph. The function may be read out by running the interpolating contactor along the interpolating potentiometer winding at uniform speed.

While illustrative forms of apparatus and methods in accordance with the invention have been described and shown herein, it will be understood that numerous changes may be made without departing from the general principles and scope of the invention.

What is claimed is:

1. An electromechanical weld programming system comprising, in combination, a plurality of interpolating potentiometers each comprising a helical winding, said windings being of substantially equal radius and coaxially aligned, each said interpolating potentiometer being assigned to a different welding parameter, a plurality of groups of parameter setting potentiometers, each said group being assigned to a different one of said welding parameters, a plurality of groups of movable contactors, the movable contactors in any one said group being arranged in a line parallel to the common axis of said helical windings, the said groups of movable contactors being distributed around the circumference of the said helical windings, each of said contactors being in contact with a said helical winding, a plurality of connecting means each individual to a different one of said parameter setting potentiometers for impressing a potential in the parameter setting potentiometer upon a different one of said movable contactors, a plurality of interpolating contactors arranged in a line parallel to the common axis of said helical windings, said interpolating contactors each being in contact with a different one of said helical windings and movable therealong without conflict with any of the movable contactors in the first mentioned groups, whereby potentials representing welding parameters may be set up on said parameter setting potentiometers and impressed upon selected points along said helical windings, said selected points corresponding to points along a seam to be welded, and whereby said interpolating contactors may pick off from said helical windings potentials at intermediate points between said selected points to determine values of welding parameters to be effective at said intermediate points to follow a program set up on said parameter setting potentiometers.

2. An electromechanical system for programming the operation of a tool, comprising, in combination, an extended interpolating winding, an interpolating contactor in contact with and movable along said interpolating winding, means to move a tool along a path on a workpiece, means coupled to said tool moving means for moving said interpolating contactor along said interpolating winding in such manner as to maintain a desired correspondence between the position of the interpolating contactor along the interpolating winding and the position of the tool on said path along the workpiece, a source of substantially constant voltage, a plurality of parameter setting potentiometers connected in parallel with each other and with said constant voltage source, each said potentiometer having an adjustable contactor movable along the length of the respective potentiometer to select a voltage thereon representative of a value of a parameter involved in the operation of the tool, a plurality of voltage applying contactors in contact with and movable along said interpolating winding, individual means connecting the said adjustable contactors of the said parameter setting potentiometers to respective ones of said voltage applying contactors to impress selected voltages upon selected points along said interpolating winding, which points correspond to respective selected points on the said path along the workpiece, said interpolating contactor being movable along said interpolating winding without interference with any of said voltage applying contactors, and means to utilize the voltage picked up from said interpolating winding by said interpolating contactor to control the said parameter according to a selected continuous function of position on the said path along the workpiece.

3. Apparatus according to claim 2, in which said interpolating winding is helical and in which said voltage applying contactors are movable along lines parallel to the axis of the said helical winding, which lines are distributed around the circumference of the helical winding, so that said voltage applying contactors are individually movable over desired respective ranges without mutual interference.

4. In programming the operation of a tool, an improved process comprising: applying respective selected voltages to a plurality of points along an extended potentiometer in accordance with a desired program, moving an interpolating contactor along said potentiometer while moving a tool to be controlled along an extended work path, coordinating the position of the interpolating contactor with the position of the tool, each along its respective path, and utilizing the voltage picked up by said interpolating contactor to determine an operating parameter of said tool for controlling the operation of said tool continuously along said work path.

5. In the weld programming of long welds, an improved process, comprising: applying respective selected voltages to a plurality of points along an extended potentiometer, moving an interpolating contactor along said potentiometer while moving a welding electrode along a weld path, coordinating the respective positions of the interpolating contactor and of the welding electrode along their respective paths, and utilizing the voltage picked up by said interpolating contactor to determine a welding parameter for controlling the welding performance of said welding electrode continuously along said weld path.

References Cited by the Examiner

UNITED STATES PATENTS

| | | | |
|---|---|---|---|
| 2,068,166 | 1/1937 | Dodge | 219—125 |
| 2,711,463 | 6/1955 | Goeppinger et al. | 338—120 |
| 2,866,596 | 12/1958 | Hoefs | 235—61.6 |
| 2,902,607 | 9/1959 | Hedges et al. | 338—89 |
| 2,934,263 | 4/1960 | Patnode | 235—61.6 |
| 3,109,919 | 11/1963 | Mattson | 219—125 |
| 3,119,009 | 1/1964 | Zeller | 219—125 |

ANTHONY BARTIS, *Acting Primary Examiner.*

JOSEPH V. TRUHE, *Examiner.*